Jan. 24, 1950
B. A. LARSON
2,495,529
COMPOUND GAUGE
Filed April 15, 1947
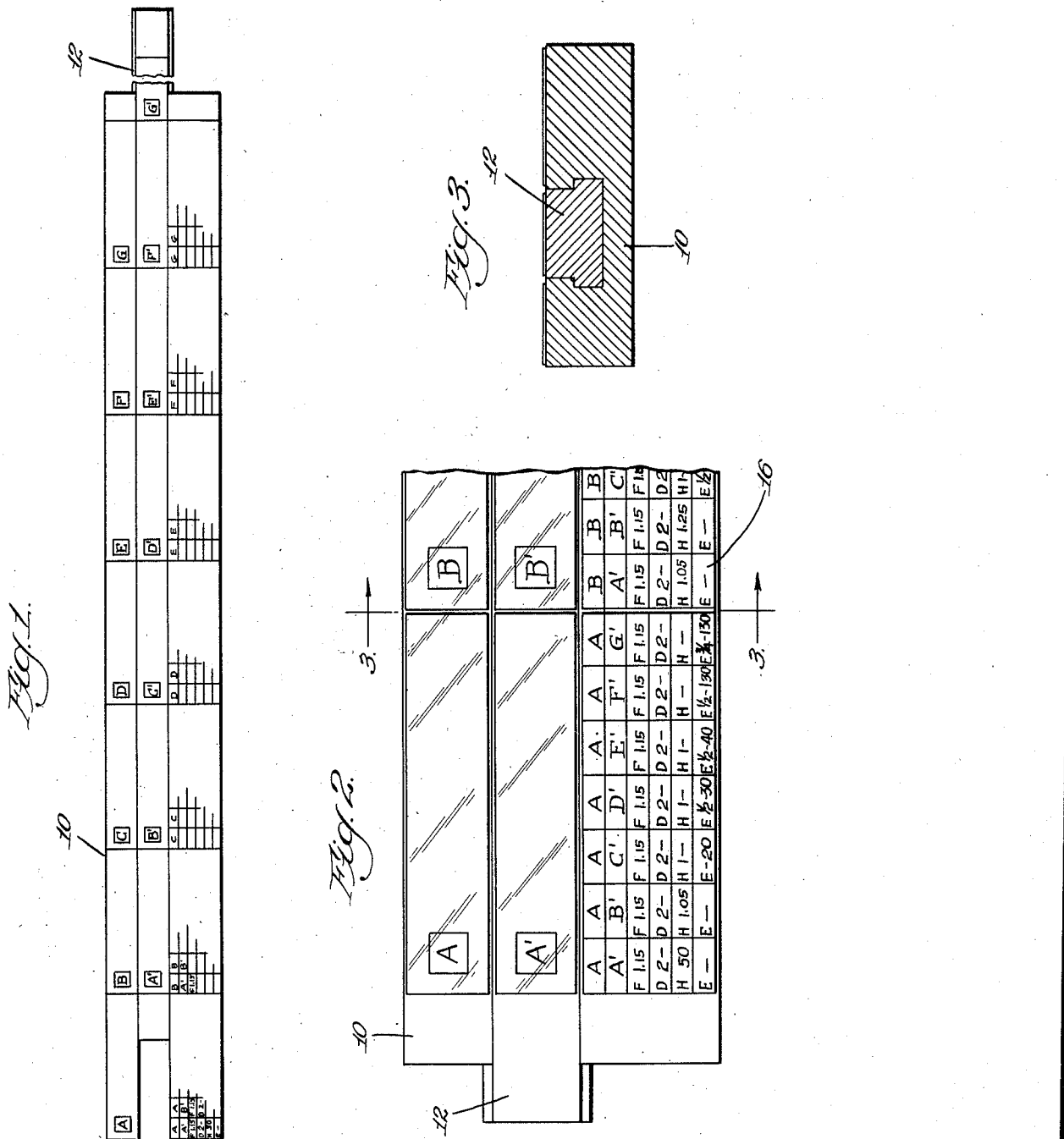
INVENTOR.
Bernhard Larson
BY
Donald H. Sweet Atty.

Patented Jan. 24, 1950

2,495,529

UNITED STATES PATENT OFFICE 2,495,529

COMPOUND GAUGE

Bernhard A. Larson, Chicago, Ill.

Application April 15, 1947, Serial No. 741,656

3 Claims. (Cl. 235—64.7)

My invention relates to the preparation of negatives for use in photo-engraving, and includes among its objects and advantages an improved method for calibrating and operating the photographic equipment for making such negatives, and a compound gauge to facilitate the rapid and accurate application of the method.

To secure best results in making up such negatives, the practice is substantially uniform of giving a plurality of different exposures with different apertures. By varying the exposure time for each different aperture a great deal can be done in improving, or at least preserving, as much contrast as there may be in the original picture from which the negative is to be made. Such originals are occasionally quite defective, but it often happens that a defective original is the only material available and the necessity of salvaging the best possible values in the original, taxes the ingenuity of the operator and wastes time and money.

The customary exposures for negatives the same size as the original are: first, an exposure to a "pinpoint" area of white paper, commonly called the "flash" exposure. This produces a minimum area black dot at each point of the negative. The next exposure is commonly called the "detail" exposure and is best made with an aperture of F/45. The next exposure is a "highlight" exposure and is made with aperture F/32. For enlargement or reducing, the procedures are set forth hereinafter. With excellent negatives these three exposures may be so interrelated as to give the best results, but as the original becomes more and more lacking in contrast, it becomes necessary to reduce the detail exposure, or the highlight exposure, or both, and to supplement with a so-called "extra" exposure with a still larger aperture. Without an accurate guide to just what series of exposures to use, the salvaging of an original having very low contrast values may involve anything from three to thirty successive attempts, at the end of which time, if the operator is really skillful, he will have arrived at a fairly close approximation to the optimum exposures for the particular density values of that original.

The purpose of the invention is to substantially eliminate this repeated and exhaustive cut-and-try method.

In the accompanying drawings;

Figure 1 is a plan view of a compound gauge according to the invention;

Figure 2 is an enlargement of one end of Figure 1; and

Figure 3 is a section on line 3—3 of Figure 2.

The gauge illustrated includes a set of relatively stationary color plaques; A, B, C, D, E, F, and G. Plaque G is approximately 50%, or midway between black and white. Plaque A is substantially 100% black, and the intervening plaques are of decreasing blackness from A to G in approximately uniform gradations. The stationary body 10 carrying the darker plaques A to G supports a slide 12, suitably connected for sliding movement, as by being made T-shaped and sliding in a T-shaped groove in the body.

The slide 12 also carries seven plaques; A', B', C', D', E', F', and G', of which G' is identical with G, being 50% black, and the intervening plaques are progressively darker in substantially equal increments.

Maximum convenience in the use of the compound gauge is secured by the use of the slide rule type of construction, because the operator can place the original picture above the gauge and move it along until, as near as he can gauge by eye, the darkest areas in the picture are of identical darkness with one of the seven body plaques. Then the original is held in position beside the selected dark plaque and the slide is moved along to find the light plaque of the same density as the lightest portion of the original. This secures two successive color matches expeditiously and quickly.

The method of the invention involves the making of the two successive color matches by eye and the subsequent exposure according to a predetermined sequence as a function of both color matches. Thus, an original with its darkest portions as dark as plaque B and its lightest portions as light as plaque A', will first be laid over the gauge beside plaque B and covering plaque A, and then the slide will be moved until plaque A' is found to be the closest match for the light areas of the picture, whereupon the operator knows that he has a B—A' combination and by reference to the table at 16 and specifically to the first column of that table, he will immediately proceed to expose his negative with a flash exposure of one minute and fifteen seconds; a detail exposure of two minutes, a highlight exposure of one minute and five seconds and no extra exposure. Similarly, an original with dark areas matching plaque A and highlights matching plaque F', should have a flash exposure of one minute and fifteen seconds; a detail exposure of two minutes; no highlight exposure at all; and an extra exposure of one minute and thirty seconds with the shutter halfway between F/32 and F/22.

The tables on the gauge are seven in number, each one corresponding to the stationary plaque above it, and each divided into seven columns with the columns lettered to correspond with the plaques on the slide so that all forty-nine possible combinations of lightness and darkness are included in the tables, and all the combinations involving each stationary plaque are directly under that stationary plaque where the appropriate column can be selected as soon as the match between the plaque on the slide and the highlights of the picture has been made. Of these forty-nine combinations, one combination is entirely hypothetical, because a so-called original with its darkest portions 50% black and its lightest portions 50% black is not a picture at all. Accordingly, the seventh column under stationary plaque G gives no exposures.

The values given by the gauge are the result of prolonged experiment for each of the forty-eight different combinations. They will be found substantially accurate and effective when the exposure is made with the original illuminated with two standard Atlas arc lamps drawing 35 amperes at 220 volts, which arc lamps are on opposite sides of the picture to be illuminated lying 36 inches away from the center of the picture in a direction at an angle of substantially 45° to the plane of the picture.

All the numerical values for detail exposures, identified in the tables as D, are with an aperture of F/45. All highlight exposures, identified by H in the tables, are with an aperture of F/32. The extra exposures, identified by E in the chart, are given with two numerical values. The first value is the number of stops below F/32 for the aperture. Thus the figure E¾ means to change the aperture, three-quarters of the way from F/32 down to F/22 and the figure E 1¼ means to change the aperture to F/22 and one-quarter of the way beyond toward F/16. After these values, the succeeding figure gives the number of seconds exposure, and where more than two digits are included the first digit means minutes and the next two digits are seconds.

Because the values F/45, etc. are a standard for the speed of action of the lens, the values on the chart are applicable to any standard camera. The specific values are as follows.

| Dark Plaque | A | A | A | A | A | A | A |
|---|---|---|---|---|---|---|---|
| Light Plaque | A' | B' | C' | D' | E' | F' | G' |
| Flash | 1:15 | 1:15 | 1:15 | 1:15 | 1:15 | 1:15 | 1:15 |
| Detail F/45 | 2 | 2 | 2 | 2 | 2 | 2 | 2 |
| Highlight F/32 | :50 | 1:05 | 1 | 1 | 1 | | |
| Extra F/32 plus | | | | ½ | ½ | ½ | ¾ |
| Extra Time | | | | :30 | :40 | 1:30 | 1:30 |
| Dark Plaque | B | B | B | B | B | B | B |
| Light Plaque | A' | B' | C' | D' | E' | F' | G' |
| Flash | 1:15 | 1:15 | 1:15 | 1:15 | 1:15 | 1:15 | 1:15 |
| Detail F/45 | 2 | 2 | 2 | | | | |
| Highlight F/32 | 1:05 | 1:25 | 1: | 1:30 | 2 | | |
| Extra F/32 plus | | | ½ | ½ | ½ | ⅞ | 1 |
| Extra Time | | | :30 | :30 | :30 | 1:15 | 1:15 |
| Dark Plaque | C | C | C | C | C | C | C |
| Light Plaque | A' | B' | C' | D' | E' | F' | G' |
| Flash | 1:15 | 1:15 | 1:15 | 1:15 | 1:15 | 1:15 | 1:15 |
| Detail F/45 | 2 | 2 | 1 | | | | |
| Highlight F/32 | 1:30 | :50 | 1:15 | 1:15 | 1 | | |
| Extra F/32 plus | ½ | ½ | ½ | ¾ | ¾ | ¼ | ¼ |
| Extra Time | :40 | :45 | 1:15 | 1 | 1 | 1:15 | |
| Dark Plaque | D | D | D | D | D | D | D |
| Light Plaque | A' | B' | C' | D' | E' | F' | G' |
| Flash | 1:15 | 1:15 | 1:15 | 1:15 | 1:15 | 1:15 | 1:15 |
| Detail F/45 | | | | | | | |
| Highlight F/32 | 1 | 1 | 1 | 1 | 1 | 1 | 1 |
| Extra F/32 plus | ½ | ½ | ½ | ¾ | 1 | 1¼ | 1¼ |
| Extra Time | 1 | 1:15 | 1:30 | 1:30 | 1:35 | 1:35 | 1:35 |
| Dark Plaque | E | E | E | E | E | E | E |
| Light Plaque | A' | B' | C' | D' | E' | F' | G' |
| Flash | 1:15 | 1:15 | 1:15 | 1:15 | 1:15 | 1:15 | 1:15 |
| Detail F/45 | | | | | | | |
| Highlight F/32 | 1 | 1 | 1 | 1 | 1 | 1 | 1 |
| Extra F/32 plus | 1¼ | ¼ | ¼ | 1 | 1 | 1¼ | 1¼ |
| Extra Time | 1 | 1:15 | 1:30 | 1:30 | 1:45 | 1:45 | 1:45 |
| Dark Plaque | F | F | F | F | F | F | F |
| Light Plaque | A' | B' | C' | D' | E' | F' | G' |
| Flash | 1:15 | 1:15 | 1:15 | 1:15 | 1:15 | 1:15 | 1:15 |
| Detail F/45 | | | | | | | |
| Highlight F/32 | | | | | | | |
| Extra F/32 plus | 1 | 1 | 1 | 1 | 1¼ | 1⅜ | 1½ |
| Extra Time | 1 | 1:10 | 1:20 | 1:40 | 1:15 | 1:30 | 1:20 |
| Dark Plaque | G | G | G | G | G | G | G |
| Light Plaque | A' | B' | C' | D' | E' | F' | G' |
| Flash | 1:15 | 1:15 | 1:15 | 1:15 | 1:15 | 1:15 | 1:15 |
| Detail F/45 | | | | | | | |
| Highlight F/32 | | | | | | | |
| Extra F/32 plus | 1 | 1 | 1¼ | 1¼ | 1⅜ | 1½ | |
| Extra Time | 1:15 | 1:30 | 1:15 | 1:30 | 1:15 | 1:15 | |

The values in the foregoing table are for use in making copper photo-engraving plates where the negative is the same size as the original. Where the negative is enlarged or reduced it is customary to vary the size of the pinpoint for the flash exposure and this may be done in the convenient way common in the prior art. Subsequently, the detail highlight and extra exposures should have the aperture changed accordingly to values well-known and tabulated in the prior art. For instance, in the book, "Process Photography and Plate-Making" by J. S. Mertle, published June 1940, by the G. Cramer Dry Plate Company, of St. Louis, Missouri, page 45B gives one of the most convenient tables for enlargements and reductions. According to the Cramer table, the zero, or 1 to 1, position for the lens, with the lens separated from the original and from the negative by twice its focal length, is used as a reference point. When the lens is moved closer to the negative for reduction purposes, the aperture is reduced one-quarter of a step for a movement of 0.17 of a focal length; one-half a step for a movement of 0.32 of the focal length; three-quarters of a step for a movement of 0.45 of the focal length; a full step for a movement of 0.59 of the focal length; one and one-quarter steps for a movement of 0.70 of the focal length; and one and one-half steps for a movement of 0.81 of the focal length. In making enlargements the aperture needs to be increased one-quarter step for a movement of 0.15 of the focal length; one-half step for a movement of 0.27 of the focal length; three-quarters of a step for a movement of 0.37 of the focal length; and one and one-quarter steps for a movement of 0.52 of the focal length.

The following table gives what I have found to be the most satisfactory values for pin hole size and for spacing between the screen and the negative:

| Screen Lines Per Inch | Opening Number | Spacing From Screen to Plate |
|---|---|---|
| | | Inches |
| 100 | 10 | 19⁄32 |
| 110 | 9½ | 9⁄32 |
| 120 | 9 | 8⁄32 |
| 133 | 8 | 6⁄32 |
| 150 | 7 | 5⁄64 |

The opening number given above is for the standard Douthitt Rotary Flash Stop, well known in the art.

All these conversion tables or ratios with respect to enlargement or reduction in size of the picture, pinhole size, and screen spacing, are well known in the prior art, and those skilled in the art would know how to adjust their cameras fairly well without specific instructions. However, the details have been included herein as a matter of precaution, and may be of some additional assistance to others in securing the very best results quickly and easily.

Others may readily adapt the invention for use under various conditions of service by employing one or more of the novel features disclosed or equivalents thereof. It will, for instance, be obvious that for special work of extreme range, it might be desirable to determine complete exposure prescriptions for faded originals having their darkest portions equivalent to plaque F' or E' and their lightest portions equivalent to B' or A'.

Similarly, it is not impossible to get usable reproductions from darkened originals having their lightest portions as dark as plaques F or E, provided the darkest portions of those originals are materially darker than the light portions. The development of procedure for such faded or darkened originals involves only an empirical extension of the principle of the invention. In everyday work such abnormal originals are so rarely encountered that I prefer to provide the equipment in the form illustrated herein. The plaques of the equipment illustrated are perfectly operative for measuring up a faded or darkened original, but because both matches are with plaques on the same member, it is necessary to move the original with respect to the member. And accordingly, it is more convenient to have the exposure procedure printed on separate cards for the different combinations and let the operator write down the combination he finds by comparison with the plaques and look up the corresponding exposure prescription.

It will also be obvious that the specific values given are for the plates and films at present standard for photoengraving work, and that if future developments should change the characteristics of the plates and films, it will be necessary to compute a new set of values by trial and error. Similarly, the values given are those that work best with photo-engraving developing baths kept under standard conditions. Specifically, the specific values given have been experimentally determined, using developer made up according to the following formula:

| | | |
|---|---|---|
| Water, about 90° F. | cc. | 500 |
| Sodium sulfite, desiccated | grams | 30.0 |
| Paraformaldehyde | do | 7.5 |
| Sodium bisulfite | do | 2.2 |
| Boric acid, crystals | do | 7.5 |
| Hydroquinone | do | 22.5 |
| Potassium bromide | do | 1.6 |
| Water to make | liters | 1.0 |

As the speed of the developer is affected materially by temperature and exhaustion of the chemical in the bath, the further specification is given that I have secured best results by starting work in the morning with developer of the above formula at 60° F. and the working speed of the bath is practically the same as it was at the start.

The specific values given are such that with copper plates it is possible to increase the contrast in the original picture without any retouching or re-etching. The same method is applicable to other photo-engraving processes, and the specific values will work on zinc plates. However, it is believed that long experimental experience on zinc and other plates would be likely to dictate minor revisions of some of the specific values given herein for copper.

As at present advised, with respect to the apparent scope of my invention, I desire to claim the following subject matter.

1. Equipment for determining exposures for making photo-engraving negatives comprising, in combination: a first member carrying a series of uniformly graduated dark shade plaques from black up to a predetermined density, or lightness; a second member carrying a series of uniformly graduated light shade plaques from white down to a predetermined density, or darkness; means slidably connecting said members, whereby any plaque on one of the members can be positioned closely adjacent to any plaque on the other member, and whereby an original may be laid over one member with its darkest portion matched with a plaque on said member, and subsequent movement of the other member can bring into closely adjacent relation with said original and first matched plaque, the plaque on the second member matching the lightest area on said original; and a chart indicating the appropriate flash, detail, highlight, and extra exposures for the combination of plaques found to match the original; said chart including a portion positioned adjacent each dark plaque, giving the exposure values for the combination of that dark plaque with all the light plaques.

2. Equipment for determining exposures for making photoengraving negatives comprising, in combination: a first member carrying a series of graduated dark shade plaques from black up to predetermined density, or lightness; a second member carrying a series of graduated light shade plaques from white down to a predetermined density, or darkness; means slidably connecting two said members, whereby any plaque on one of the members can be positioned closely adjacent to any plaque on the other member, and whereby an original may be laid over one member with its darkest portion matched with a plaque on said member, and subsequent movement of the other member can bring into closely adjacent relation with said original and first matched plaque, the plaque on the second member matching the lightest area on said original; and a chart indicating an appropriate empirically determined series of exposures for the combination of plaques found to match the original; said chart including a portion positioned adjacent each plaque on one of said members, giving the exposure values for the combination of that plaque with all the plaques on the other member.

3. Equipment for determining exposures for making photoengraving negatives comprising, in combination, a first member carrying a series of graduated dark shade plaques from black up to a predetermined density or lightness; a second member carrying a series of graduated light shade plaques from white down to the same predetermined density; said predetermined density being substantially 50%; means slidably connecting said members, whereby any plaque on one of the members can be positioned closely adjacent to any plaque on the other member, and whereby an original may be laid over one member with its darkest or lightest portion matched with a plaque on said member, and subsequent movement of the other member can bring into closely adjacent relation with said original and first matched plaque, the plaque on the second member matching the lightest or darkest area on said original; and a unitary chart indicating for each plaque on one of said members an appropriate empirically determined series of exposures for the combination of that plaque with each of the plaques on the other member.

BERNHARD A. LARSON.

REFERENCES CITED

The following references are of record in the file of this patent:

UNITED STATES PATENTS

| Number | Name | Date |
|---|---|---|
| 1,262,444 | Capstaff | Apr. 9, 1918 |
| 1,289,129 | Douthitt | Dec. 31, 1918 |
| 1,858,340 | Osborne | May 17, 1932 |
| 2,204,080 | Hansch | June 11, 1940 |
| 2,207,375 | Friedell | July 9, 1940 |
| 2,253,231 | Friedell | Aug. 19, 1941 |
| 2,322,044 | McFarlane | June 15, 1943 |